United States Patent [19]

Kitai

[11] 4,117,205
[45] Sep. 26, 1978

[54] ELECTRIC STORAGE BATTERY

[75] Inventor: Yasuo Kitai, Kumagaya, Japan

[73] Assignee: Shin-Kobe Electric Machinery Co., Ltd., Tokyo, Japan

[21] Appl. No.: 862,057

[22] Filed: Dec. 19, 1977

[30] Foreign Application Priority Data

Dec. 29, 1976 [JP] Japan .............................. 52-176082[U]

[51] Int. Cl.$^2$ ............................................. H01M 2/12
[52] U.S. Cl. ........................................ 429/86; 429/88
[58] Field of Search .................................. 429/86, 88

[56] References Cited

U.S. PATENT DOCUMENTS

| | | | |
|---|---|---|---|
| 3,597,280 | 8/1971 | Hennen | 429/88 |
| 3,708,348 | 1/1973 | Painter et al | 429/88 |
| 3,772,088 | 11/1973 | Hennen et al. | 429/86 |
| 3,879,227 | 4/1975 | Hennen | 429/86 |

*Primary Examiner*—Donald L. Walton

[57] ABSTRACT

An electric storage battery comprising a closure sealed with a battery casing and having gas venting means which allows gases from cells to be vented out of the storage battery, but which prevents electrolyte mist and water steam from the cells carried together with the gases to be leaked out of the storage battery. A gas cooling chamber is provided on a battery cover of the closure and has a water returning cylindrical portion provided on a bottom of the gas cooling chamber and having a water returning lateral port adapted to return the water. A gas filter chamber is provided adjacent to the gas cooling chamber to communicate with the gas cooling chamber through an opening in the wall of the gas cooling chamber at the top thereof and has an explosion-proof gas filter of porous ceramics provided to vent gases therethrough. A labyrinth chamber is provided in the gas cooling chamber at the bottom thereof to vertically move through a tortuous path gases together with electrolyte mist and water steam and has an inlet through which the gases together with the electrolyte mist and the water steam are introduced into the labyrinth chamber and an outlet through which the gases with the remaining water are introduced into the gas cooling chamber. The labyrinth chamber is also provided with an electrolyte returning port adapted to return the liquefied electrolyte into the battery cells.

7 Claims, 2 Drawing Figures

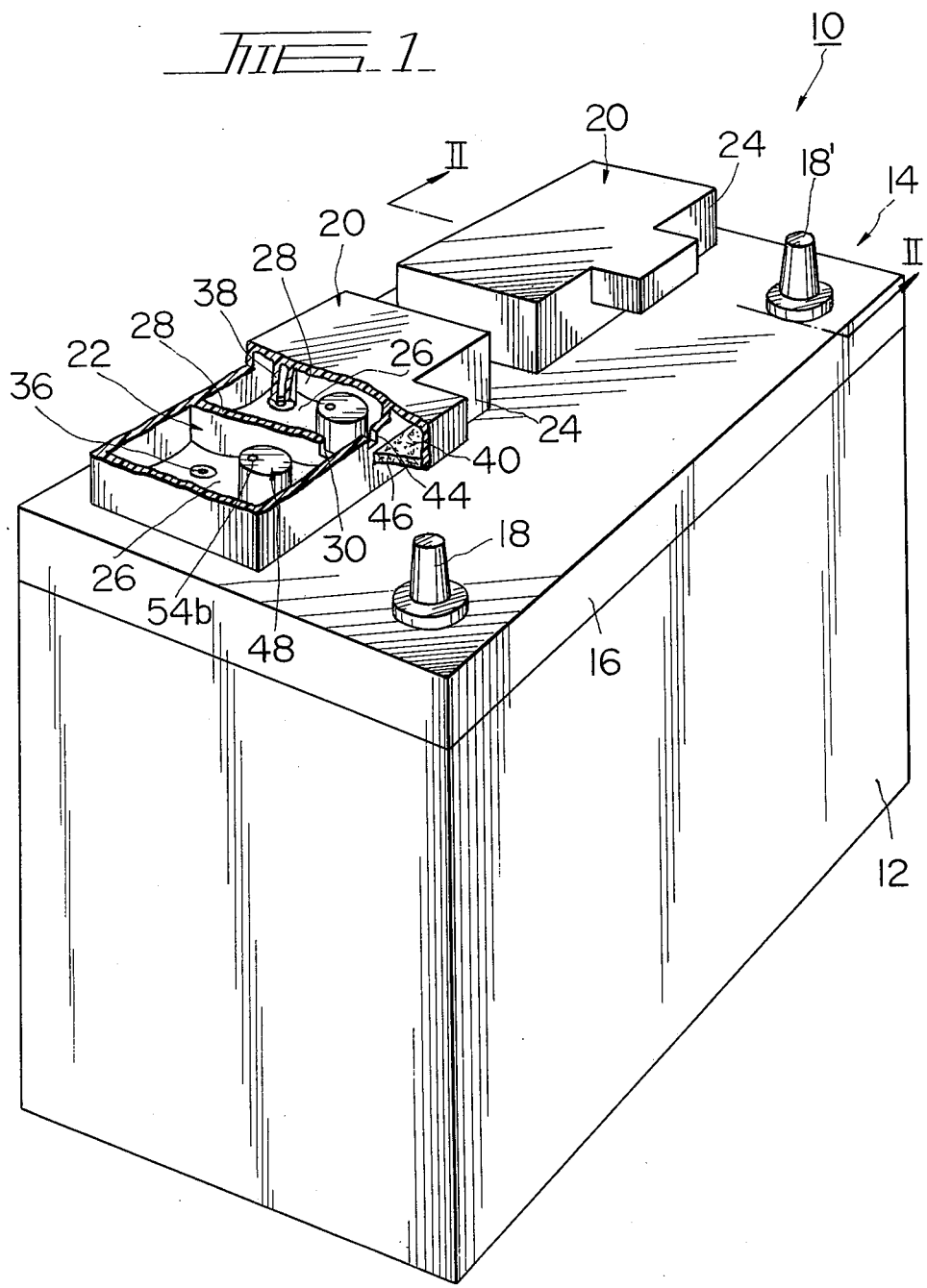

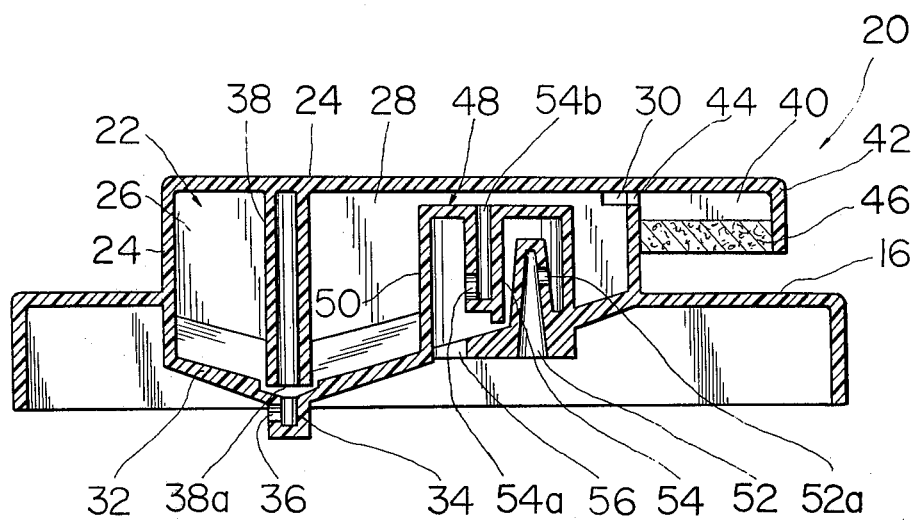

ELECTRIC STORAGE BATTERY

BACKGROUND OF THE INVENTION

In prior electric storage batteries for an automobile, plates usually comprise a grid composed of lead alloy containing antimony at 4 to 5 percent by weight. Since such storage batteries have an overcharging current passing therethrough to a certain degree even after they are completely charged, water in the electrolyte is electrolysed into gases so as to decrease the amount of the electrolyte. Water pouring openings which are usually provided on the tops of the battery cells cause the water to vapor therethrough due to heat from the engine of the automobile or due to heat produced when the storage batteries are charged, and therefore, the water in the electrolyte tends to be shortened. In order to maintain the performance of the storage battery, an operator should supply water regularly so as to preserve a predetermined amount of water in the electrolyte.

Of late, there may be used plates composed of lead alloy containing antimony at 2 to 3 percent by weight or containing calcium instead of antimony. In the storage battery using such plates, an overcharging current after the complete charge of the storage battery is advantageously prevented and therefore shortage of water is also prevented so that water may not be supplied. However, it is impossible to completely prevent the overcharging current from flowing through the storage battery. Thus, water is still evaporated due to heat from a modicum of overcharging current or due to heat from the engine of the automobile.

There are proposed various gas venting systems in which gases are vented out of the storage battery, but electrolyte mist which tends to be carried together with the gases is prevented from leakage out of the battery casing. One example of such gas venting systems is illustrated and described in the U.S. Pat. No. 3,772,088, in which a closure assembly for a storage battery is disclosed. In the gas venting system of the U.S. Patent, the gases from the cells are directed to a common channel and through a porous ceramic filter outside of the closure assembly. Electrolyte which is carried together with the gases are prevented from leakage by baffles and dams disposed in the channels. However, the gas venting system of this Patent is constructed to direct the gases in a horizontal manner through the closure assembly, and as a result the electrolyte mist cannot be effectively separated from the gases. This causes the substantial amount of the electrolyte mist to be leaked out of the battery cover. Furthermore, the distance between the inlet and the outlet of the gas venting system is so short that the electrolyte mist tends to be leaked together with the gases out of the storage battery.

SUMMARY OF THE INVENTION

Accordingly, it is a principal object of this invention to provide an electric storage battery adapted to fully liquefy electrolyte mist and water steam in chambers of a gas venting system, so as to effectively separate the electrolyte mist and the water steam from the gases so that only the gases are vented out of the storage battery while the electrolyte and the water are returned to the cells.

It is another object of the invention to provide an electric storage battery adapted to effectively prevent the gases containing the electrolyte mist and the water steam from direct introduction through a water returning port so as to improve the separation of the electrolyte and the water from the gases.

It is further object of the invention to provide an electric storage battery adapted to prevent an explosion-proof gas filter from clogging so as to elongate the life of the gas filter.

In accordance with the invention, there is provided an electric storage battery comprising a closure including a battery cover sealed with a battery casing and gas venting means to vent only gases out of said closure, said gas venting means comprising a gas cooling chamber including a plural of divided chamber portions communicating with respective cells of said storage battery, so as to receive gases from said cells and communicating with each other through openings provided adjacent to the tops thereof, said gas cooling chamber having a water returning lateral port provided at the bottom of said divided chamber portions; a gas filter chamber provided adjacent to said gas cooling chamber to communicate with said gas cooling chamber through an opening in the wall of said gas cooling chamber at the top thereof and having an explosive-proof gas filter disposed in said gas filter chamber so as to vent said gases therethrough; and a labyrinth chamber provided to vertically move through a tortuous path said gases together with electrolyte mist and water steam and having an inlet through which said gases together with said electrolyte mist and said water steam are introduced into said labyrinth chamber and an outlet through which said gases with the remaining water steam are introduced into said gas cooling chamber, said labyrinth chamber further having an electrolyte returning port provided at the bottom of said labyrinth chamber.

BRIEF DESCRIPTION OF THE DRAWINGS

The above and other objects and features of the invention will be apparent from the description of one embodiment of of the invention taken with reference to the accompanying drawings in which;

FIG. 1 is a perspective view of an electric storage battery constructed in accordance with the invention, with portions broken away for illustrating the details of gas venting means;

and FIG. 2 is a vertical cross sectional view of a closure taken along line II—II of FIG. 1 and showing the construction of the gas venting means.

DETAILED DESCRIPTION OF THE PREFERRED EMBODIMENT

FIG. 1 shows a lead-acid type electric storage battery 10 constructed in accordance with one embodiment of the invention. The electric storage battery 10 comprises a battery casing 12 of acid resisting material such as polypropylene and a closure 14 composed of the same material and sealingly bonded with the battery casing 12. The battery casing 12 contains a plural of cells (six cells, for example) including battery elements such as positive and negative plates, separators and electrolyte, respectively.

The closure 14 comprises a battery cover 16 which has positive and negative terminals 18 and 18' provided thereon. Gas venting means 20 are provided on the battery cover 16 and will be described in detail hereinjustbelow.

The gas venting means 20 may have two gas cooling chambers 20 and 20 which are adapted to respectively receive gases from some of the cells in the battery casing 12. If the storage battery 10 includes six cells, one of the gas cooling chambers 20 and 20 may receive the gases from three ones of the six cells while the other gas cooling chamber 20 may receive the gases from the other three cells. The gas cooling chambers 20 are constructed in the substantially same manner and therefore one of the gas cooling chambers 20 and the connected components will be described hereinafter.

The gas cooling chamber 22 is defined by chamber wall 24 which is secured to the battery cover 16 by any suitable means. The gas cooling chamber 22 may include three divided chamber portions 26 defined by two partitions 28. Each of the divided chamber portions 26 communicates with each other through an opening 30 provided in the partition 28 adjacent to the top thereof. As shown in FIG. 2, the bottom 32 of the divided chamber portions 26 is downwardly inclined toward the point where a bottomed cylindrical portion 34 is provided. In the cylindrical portion 34 is provided a water returning lateral port 36 through which condensed water is returned to the battery casing 12. A protecting cylindrical cover 38 may be suspended from the top of the chamber wall 24 so that the lower opening 38a of the protecting cylindrical cover 38 is faced with the cylindrical portion 34 at the top thereof. Thus, even if the electrolyte enters into the divided chamber portions 26 through the water returning port 36, the protecting cylindrical cover 38 serves to protect the electrolyte from expansion all over the divided chamber portions 26, which causes the electrolyte to be leaked out of the battery cover 16.

A gas filter chamber 40 is defined by chamber wall 42 which is secured to the chamber wall 24 of the gas cooling chamber 22 by any suitable means, and communicates with one of the divided chamber portions 26 through an opening 44 provided in the chamber wall 24 of the gas cooling chamber 22 at the top thereof. Thus, gases entering the gas cooling chamber 22 pass through the openings 30 and 44 and enter the gas filter chamber 40, while the water steam contained in the gases is cooled and condensed by the chamber wall 24 which is in turn cooled by the atmosphere and is dropped to the bottom 32 of the gas cooling chamber 22 so as to be returned to the battery casing 12 through the water returning lateral port 36. A gas filter 46 may be composed of porous ceramics, for example, so as to restrain the gases from explosion and may be disposed at the lower opening of the gas filter chamber 40 and secured to the chamber wall 42 of the gas filter chamber 40 by any suitable means. The gas filter 46 may be preferably spaced from the top of the battery cover 16 at a distance of more than 1 mm, as shown in FIG. 2. This causes the gases to be vented downwardly through the gas filter 46. As a result, the gas filter 46 is prevented from clogging due to dust, dirt, sand and so on, which causes the life of the gas filter 46 to be elongated.

A labyrinth chamber 48 is provided at the inlet of the gas cooling chamber 22 and defined by chamber wall 50 secured to the bottom of the gas cooling chamber 22 by any suitable means. The labyrinth chamber 48 may include a frusto-conical gas introducing port 52 having an inlet 52a provided in the side wall of the port 52 to introduce the gases together with electrolyte mist and water steam into the labyrinth chamber 48, and a cylindrical baffle 54 having a lower opening 54a provided in the side wall of the baffle 54 and an outlet 54b provided at the top of the baffle to introduce the gases into the gas cooling chamber 22. As shown in FIG. 2, the bottom of the labyrinth chamber 48 is inclined toward the point where an electrolyte returning port 56 is provided. Thus, the gases together with the electrolyte mist and the water steam are introduced through the inlet 52a into the labyrinth chamber 48 and flow vertically through a tortuous path by means of the baffle 54 and through the lower opening 54a and the outlet 54b into the gas cooling chamber 22. Meanwhile, the electrolyte mist is cooled and condensed by the wall 50 of the labyrinth chamber 48 and the baffle 54 and returned through the electrolyte returning port 56 to the battery casing 12.

In operation, the gases together with the accompanying electrolyte mist and water steam which are produced within the cells of the storage battery 10, are introduced through the frusto-conical gas introducing port 52 and then through the inlet 52a thereof into the labyrinth chamber 48. Since the labyrinth chamber 48 is obstructed by the cylindrical baffle 54, the electrolyte mist contained in the gases is accumulated in the labyrinth chamber and condensed by the baffle 54 and the wall 50 of the labyrinth chamber 48. Thus, the liquefied electrolyte is deposited on the inclined bottom of the chamber and returned through the electrolyte returning port 56 to the cells of the storage battery 10. The gases together with the remaining water steam are directed through the lower opening 54a into the cylindrical baffle 54 and then introduced through the outlet 54b into the gas cooling chamber 22. Since the top wall of the gas cooling chamber 22 is cooled by the atmosphere, the remaining water steam is condensed by the top wall of the chamber 22 into a liquid, which is in turn dropped on the inclined bottom 32 of the gas cooling chamber 22 and returned through the cylindrical portion 34 and then through the water water returning lateral port 36 to the cells of the storage battery 10. Thus, it will be understood that the electrolyte mist contained by the gases is separated from the gases by the labyrinth chamber, while the water steam contained by the gases is separated from the gases by the gas cooling chamber 22.

The gases separated from the electrolyte mist and the water steam are introduced through the openings 30 and 44 into the gas filter chamber and then downwardly vented through the explosion-proof gas filter 46 out of the battery cover 16. It will be noted that the explosion-proof gas filter 46 serves to prevent the gases from ignition and explosion due to the heat of the fire, and that since the gas filter is faced, it is prevented from clogging due to dust, dirt, sand and so on.

It should be noted that the gases with the accompanying electrolyte mist or water steam vertically flow through the gas venting means 20, which causes the electrolyte mist and the water steam to be effectively separated from the gases because of contact of the electrolyte mist and the water steam with the walls of the gas cooling chamber 22 and the labyrinth chamber 48 including the baffle 54 at a larger contact area. As noted from FIG. 2, even though some of the gases are introduced through the electrolyte returning port 56, the contained electrolyte mist is separated from the gases in the same manner as aforementioned.

While a preferred embodiment is illustrated and described with reference to the accompanying drawings, it will be understood that various changes and modifications may be made without departing from the spirit and scope of the invention, which is intended to be defined to the appended claims.

What is claimed is:

1. An electric storage battery comprising a closure including a battery cover sealed with a battery casing and gas venting means to vent only gases out of said closure, said gas venting means comprising a gas cooling chamber including a plural of divided chamber portions communicating with respective cells and said electric storage battery, so as to receive gases from said cells and communicating with each other through openings provided adjacent to the tops thereof, said gas cooling chamber having a water returning lateral port provided at the bottom of said divided chamber portions; a gas filter chamber provided adjacent to said gas cooling chamber to communicate with said gas cooling chamber through an opening in the wall of said gas cooling chamber at the top thereof and having an explosion-proof gas filter disposed in said gas filter chamber so as to vent said gases therethrough; and a labyrinth chamber provided to vertically move through a tortuous path gases together with electrolyte mist and water steam and having an inlet through which said gases together with said electrolyte mist and said water steam are introduced into said labyrinth chamber and an outlet through which said gases and the remaining water steam are introduced into said gas cooling chamber, said labyrinth chamber further having an electrolyte returning port provided at the bottom of said labyrinth chamber.

2. An electric storage battery as set forth in claim 1, and wherein said gas cooling chamber has a bottom inclined toward the point where said water returning port is provided.

3. An electric storage battery as set forth in claim 1, and wherein said labyrinth chamber has a bottom inclined toward the point where said electrolyte returning port is provided.

4. An electric storage battery as set forth in claim 2, said gas cooling chamber further having a protecting cylindrical cover suspended from the top wall of said gas cooling chamber so that a lower opening of said protecting cylindrical cover covers said water returning lateral port of said gas cooling chamber.

5. An electric storage battery as set forth in claim 1, said gas cooling chamber further having a cylindrical portion provided at the bottom of said gas cooling chamber and closed at the bottom of said cylindrical portion, and wherein said water returning lateral port is provided in the side wall of said cylindrical portion.

6. An electric storage battery as set forth in claim 1, and wherein said explosion-proof gas filter is disposed in a downward manner so as to vent said gases downwardly.

7. An electric storage battery as set forth in claim 1, and wherein the distance between said explosion-proof gas filter and the top wall of said battery cover is more than 1 mm.

* * * * *